United States Patent
Longobardi (10) Patent No.: US 7,780,368 B2
(45) Date of Patent: Aug. 24, 2010

(54) METHOD AND APPARATUS FOR RECONFIGURABLE KEY POSITIONING ON A KEYBOARD

(75) Inventor: Giuseppe Longobardi, Castellammare di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 12/121,201

(22) Filed: May 15, 2008

(65) Prior Publication Data

US 2009/0285616 A1    Nov. 19, 2009

(51) Int. Cl.
 *G06F 3/02* (2006.01)
(52) U.S. Cl. .................... 400/489; 400/472; 400/492
(58) Field of Classification Search .......... 400/492
 See application file for complete search history.

(56) References Cited

U.S. PATENT DOCUMENTS

| | | | |
|---|---|---|---|
| 4,831,219 A | 5/1989 | Sugiura et al. | |
| 5,141,343 A | 8/1992 | Roylance et al. | |
| 5,397,189 A | 3/1995 | Minogue | |
| 5,439,304 A | 8/1995 | Phillips et al. | |
| 5,459,461 A | 10/1995 | Crowley et al. | |
| 5,502,460 A | 3/1996 | Bowen | |
| 5,519,569 A | 5/1996 | Sellers | |
| 5,532,904 A | 7/1996 | Sellers | |
| 5,543,787 A | 8/1996 | Karidis et al. | |
| 5,554,239 A | 9/1996 | Datta et al. | |
| 5,588,759 A | 12/1996 | Cloud | |
| 5,595,449 A | 1/1997 | Vitkin | |
| 5,616,897 A | 4/1997 | Weber et al. | |

(Continued)

FOREIGN PATENT DOCUMENTS

JP          09212269 A    *    8/1997

(Continued)

OTHER PUBLICATIONS

"Computer Keyboard that is Customizable," http://www.compkeyboard.com/archives/computer-keyboard-that-is-customizable; pp. 1-4, downloaded May 14, 2008.

(Continued)

*Primary Examiner*—Daniel J Colilla
(74) *Attorney, Agent, or Firm*—Kenneth L. Sherman, Esq.; Michael Zarrabian, Esq.; Myers Andras Sherman LLP (57) ABSTRACT

A method and apparatus for a reconfigurable keyboard is provided. One implementation involves a row mounting mechanism for mounting each row of keys on a row frame, the row mounting mechanism allowing one or more keys of each row to be moved and locked in a certain row position, whereby the spacing of one or more keys in each row on the keyboard can change. The apparatus also includes a column mounting mechanism for mounting each column of keys on a column frame, the column mounting mechanism allowing one or more keys of each column to be moved and locked in a certain column position, whereby the spacing of one or more keys in each column on the keyboard can change. As such, one or more keys can be moved in row or column and to lock or unlock key positioning for arranging the keys on a keyboard according to a reconfigurable layout.

1 Claim, 13 Drawing Sheets

U.S. PATENT DOCUMENTS

| | | | |
|---|---|---|---|
| 5,635,928 A | 6/1997 | Takagi et al. |
| 5,648,771 A | 7/1997 | Halgren et al. |
| 5,659,307 A | 8/1997 | Karidis et al. |
| 5,666,112 A | 9/1997 | Crowley et al. |
| 5,717,431 A | 2/1998 | Chia-Ying et al. |
| 5,742,241 A | 4/1998 | Crowley et al. |
| 5,833,050 A | 11/1998 | Takagi et al. |
| 5,870,034 A | 2/1999 | Wood |
| 5,880,712 A | 3/1999 | Goldman |
| 5,951,178 A | 9/1999 | Lim |
| 5,982,612 A | 11/1999 | Roylance |
| 6,056,456 A | 5/2000 | Kinoshita |
| 6,068,417 A | 5/2000 | Butler |
| 6,174,097 B1 | 1/2001 | Daniel |
| 6,232,960 B1 | 5/2001 | Goldman |
| 6,331,850 B1 | 12/2001 | Olodort et al. |
| 6,472,626 B2 | 10/2002 | Hayes |
| 6,536,966 B1 | 3/2003 | Butler |
| 6,563,434 B1 | 5/2003 | Olodort et al. |
| 6,629,794 B2 * | 10/2003 | Cauwels ............... 400/492 |
| 6,644,975 B2 | 11/2003 | Heckmann, Jr. |
| D484,176 S | 12/2003 | Kennedy et al. |
| 6,707,664 B2 | 3/2004 | Murphy |
| 6,727,829 B2 | 4/2004 | Jam |
| 6,734,809 B1 | 5/2004 | Olodort et al. |
| 6,739,774 B1 | 5/2004 | Lahr |
| 6,781,077 B2 | 8/2004 | Olodort et al. |
| 6,810,119 B2 | 10/2004 | Lahr |
| 6,830,397 B2 | 12/2004 | Lahr |
| 6,839,002 B2 | 1/2005 | Olodort et al. |
| 6,879,317 B2 | 4/2005 | Quinn et al. |
| 6,882,336 B2 | 4/2005 | Lahr |
| 6,894,626 B2 | 5/2005 | Olodort et al. |
| 6,972,699 B2 | 12/2005 | Olodort et al. |
| 7,030,323 B2 | 4/2006 | Lahr |
| 7,084,787 B2 | 8/2006 | Olodort et al. |
| 7,104,715 B2 | 9/2006 | Lahr |
| 7,193,613 B2 | 3/2007 | Jam |
| 2003/0099497 A1 * | 5/2003 | Zhang ............... 400/472 |
| 2004/0012918 A1 | 1/2004 | Chen |
| 2004/0155868 A1 | 8/2004 | Hui |
| 2005/0012231 A1 | 1/2005 | Olsson et al. |
| 2005/0146447 A1 | 7/2005 | Na |
| 2006/0022947 A1 | 2/2006 | Griffin et al. |
| 2006/0045599 A1 | 3/2006 | Ongkojoyo |
| 2007/0013668 A1 | 1/2007 | Tien et al. |
| 2008/0063456 A1 * | 3/2008 | Lahr ............... 400/491 |

FOREIGN PATENT DOCUMENTS

| | | | |
|---|---|---|---|
| JP | 2000207100 A | * | 7/2000 |
| JP | 2003296002 A | * | 10/2003 |
| WO | 2006/024943 A2 | | 9/2006 |

OTHER PUBLICATIONS

"ErgoDex DX1 Keyboard with Movable Keys," http://www.gearlive.com/index.php/news/article/ergodex_dx1_keyboard_with_movable_keys_05060217/. pp. 1-5, downloaded May 14, 2008.

* cited by examiner

METHOD AND APPARATUS FOR RECONFIGURABLE KEY POSITIONING ON A KEYBOARD

BACKGROUND OF THE INVENTION

1. Field of the Invention

The present invention relates generally to user input devices and in particular to computer keyboards.

2. Background Information

The ergonomics of user input devices such as computer keyboards is important in providing comfort and efficiency. Conventional computer keyboards provide a fixed arrangement of keys, wherein according to a selected keyboard layout a key is associated to a button. The key association may be changed by varying keyboard configuration/mapping software, but each button remains in a physically fixed position on the keyboard and cannot be moved. The "one size fits all" fixed button positioning is not accommodating for different size hands and fingers, forcing certain users to place their hands relative to the keyboard buttons in an ergonomically incorrect manner. Typically, the palm hands are placed on a keyboard palm-rest, and the hands may have to repetitively move up and down the keyboard to reach certain buttons, or the fingers may need to be constrained due to close proximity of certain buttons. This is exacerbated in notebook (laptop) computers with compact keyboards, and smaller palm-rest areas crowded with track-point (touchpad) and pointer device buttons. Further, on such keyboards, fast typing frequently results in unintentionally hitting multiple buttons.

SUMMARY OF THE INVENTION

The invention provides a method and apparatus for a reconfigurable keyboard. One embodiment involves a row mounting mechanism for mounting each row of keys on a row frame, the row mounting mechanism allowing one or more keys of each row to be moved and locked in a certain row position, whereby the spacing of one or more keys in each row on the keyboard can change. The apparatus also includes a column mounting mechanism for mounting each column of keys on a column frame, the column mounting mechanism allowing one or more keys of each column to be moved and locked in a certain column position, whereby the spacing of one or more keys in each column on the keyboard can change. As such, one or more keys can be moved in row or column and to lock or unlock key positioning for arranging the keys on a keyboard according to a reconfigurable layout.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a reconfigurable keyboard apparatus. One embodiment comprises a row mounting mechanism for mounting each row of keys (buttons) on a row frame, the row mounting mechanism allowing one or more keys of each row to be moved and locked in a certain row position, whereby the spacing of one or more keys in each row on the keyboard can change. The apparatus further comprises a column mounting mechanism for mounting each column of keys on a column frame, the column mounting mechanism allowing one or more keys of each column to be moved and locked in a certain column position, whereby the spacing of one or more keys in each column on the keyboard can change. As such, one or more keys can be moved in row or column and to lock or unlock key positioning for arranging the keys on a keyboard according to a reconfigurable layout.

One implementation involves a mechanism for moving the keys (buttons) on a keyboard in rows or columns, to keep the keys together or to lock/unlock their positioning based on needed key rows/columns movement, allowing spatially rearranging the keys in a keyboard according to a specific layout, in columns and rows. The row mounting mechanism is configured for mounting each row of keys on a single frame, so that keys may be moved and locked in a certain position, wherein the spacing of the key-rows on the keyboard may change. The column mounting mechanism is configured for mounting each column of keys on a single frame, so that it may be moved and blocked in a certain position, wherein the spacing of the key-columns on the keyboard may change.

For example, a user may prefer the Fn keys that are on the top of the keyboard, be repositioned closer to the numeric keys in the first row, so that the user can hit the Fn keys without raising his hand from the palm-rest or without stretching fingers. The same may apply to the key columns for optimal/desired spacing. On a notebook computer, the same may apply to a touchpad. The entire keyboard section may be moved (e.g., closer to the display screen), the touchpad may be moved to a more comfortable position (e.g., closer to the right side for operation by the right thumb without moving the right hand from the palm-rest).

This keyboard customization (i.e., positioning/space varying) by a user as desired, provides a more comfortable typing experience and may contribute to improved ergonomics and typing efficiency. The mechanical and electrical function of each key remains unchanged, but the position of the key relative to others may be changed as desired.

Figure 1:
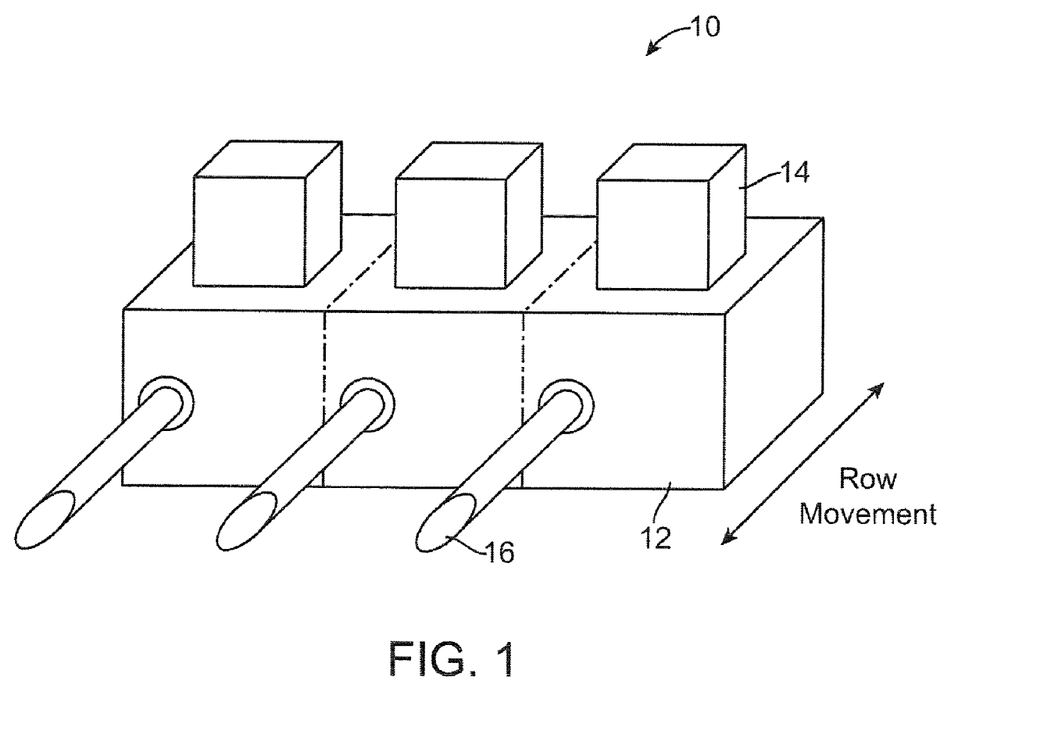
FIG. 1 shows an example row mechanism for reconfigurable key positioning on a keyboard, according to an embodiment of the invention.
Figure 2:
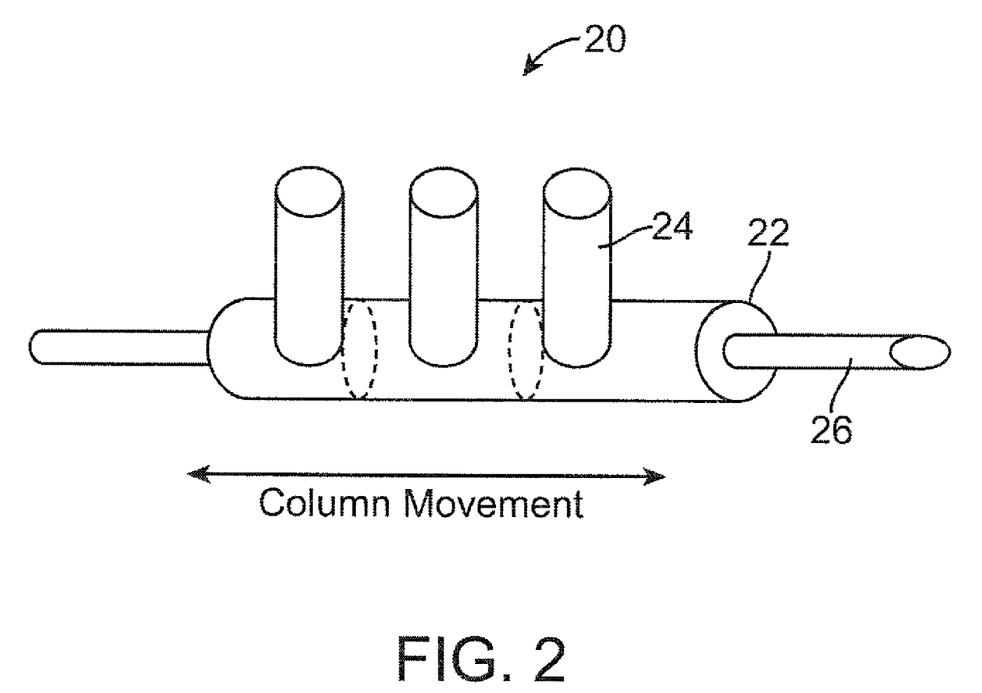
FIG. 2 shows an example column mechanism for reconfigurable key positioning on a keyboard, according to an embodiment of the invention.

FIG. 1 shows an example implementation for moving keys on a keyword in rows, to keep the keys together or to lock/unlock their positioning based on desired key rows/columns movement. For row movement, a row mechanism 10 includes a frame 12 for keys 14, and a cylinder 16 on which the frame 12 may slide when unlocked. As shown by example in FIG. 2, for column movement, a row mechanism 20 includes a frame 22 for keys 24, and a cylinder 26 on which the frame 22 may slide when unlocked. Each key 14 can be moved in two different, transverse, directions (e.g., row and column).

Figure 3:
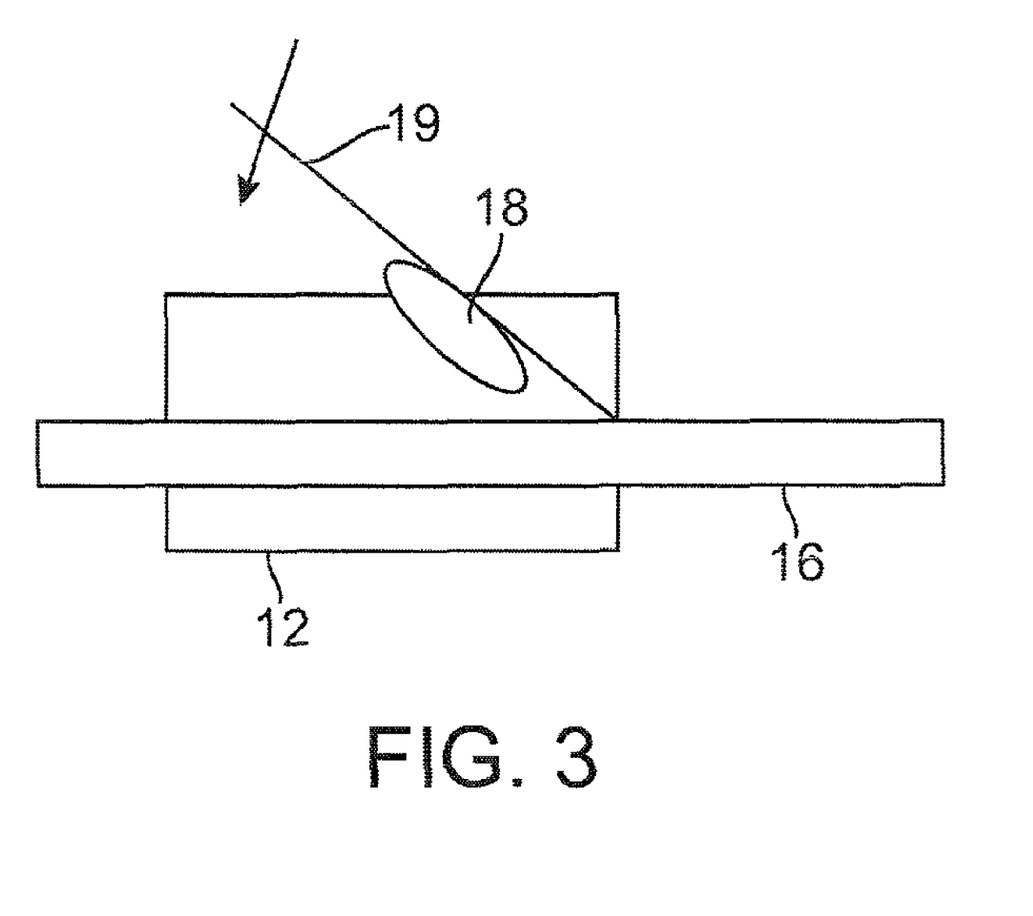
FIG. 3 shows an example stopper for locking keys on a guide, according to an embodiment of the invention.
Figure 4:
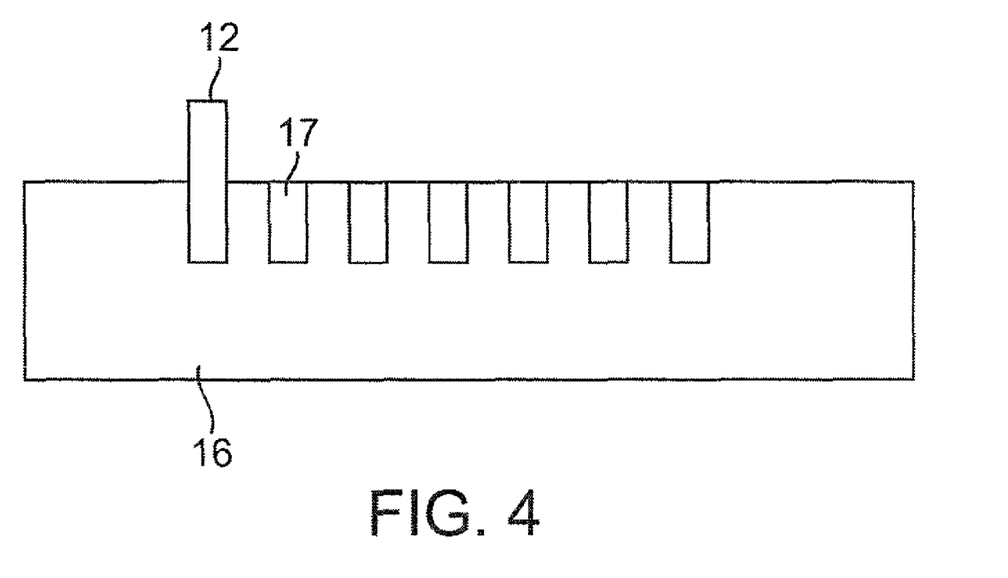
FIG. 4 shows another example stopper for locking keys on a guide, according to an embodiment of the invention.

In each case, to lock/unlock the frame 12 on the cylinder 16, a friction mechanism may be used to help stop the sliding frame in place. The friction mechanism may include a stopper 18 (FIG. 3) that may be acted by an external lever 19 (one per row and one per column). When the stopper 18 contacts the cylinder 16, the frame 12 is locked in place on the cylinder 16. The friction mechanism may alternatively include bumpers 17 (FIG. 4) that automatically stop the frame 12 on the cylinder 16 at certain fixed steps 17A.

Figure 5:
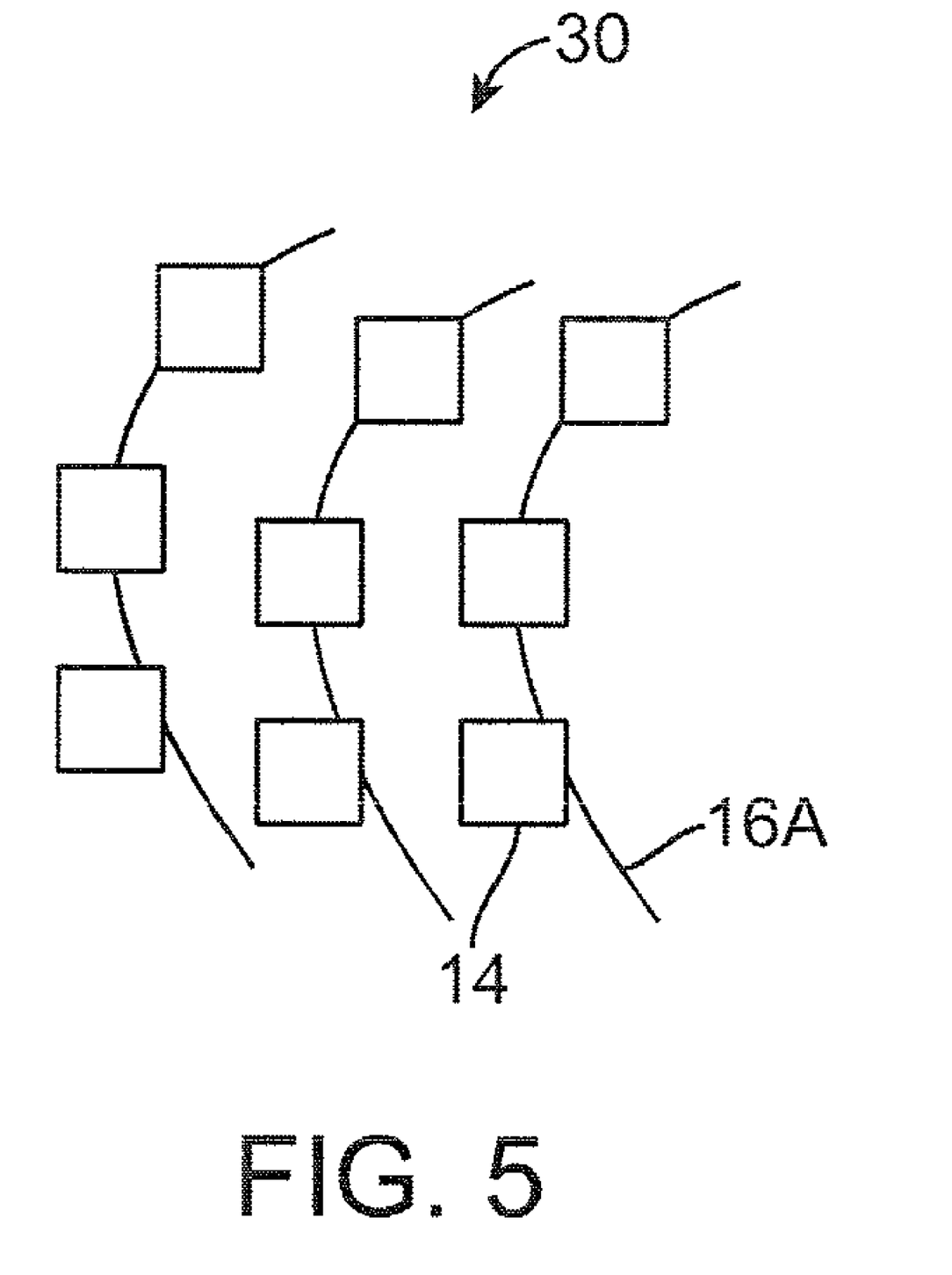
FIG. 5 shows an example of flexible guides for key positioning, according to an embodiment of the invention.
Figure 6A:
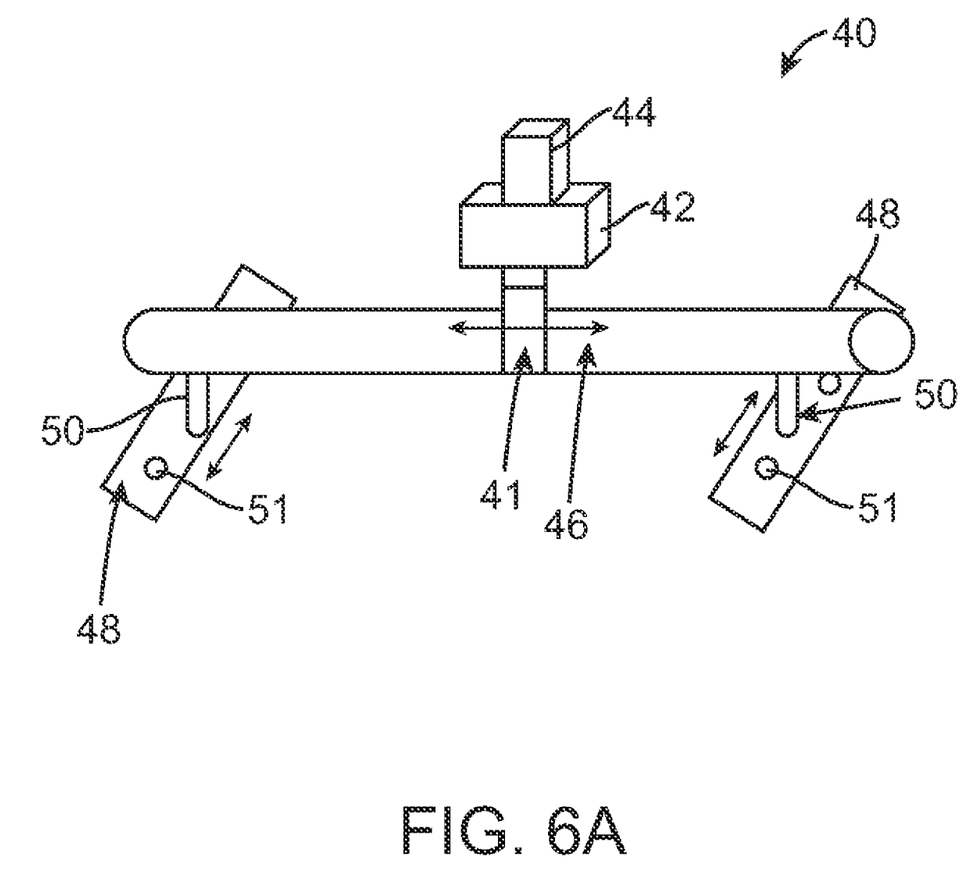
FIG. 6A shows example row and column mechanisms for reconfigurable key positioning on a keyboard, according to an embodiment of the invention.
Figure 6B:
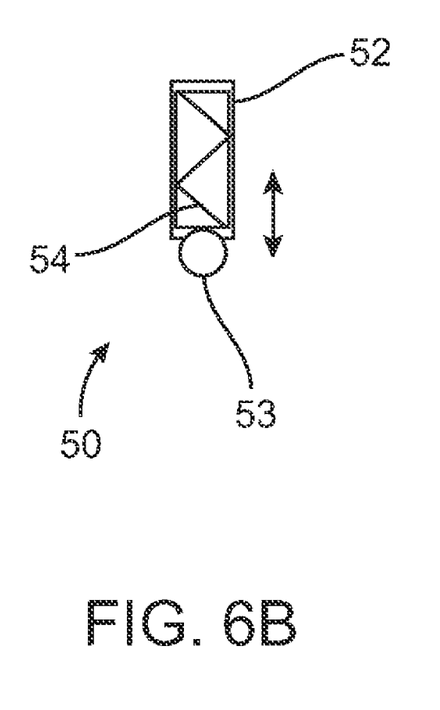
FIG. 6B shows details of a locking mechanism of FIG. 6A.
Figure 6C:
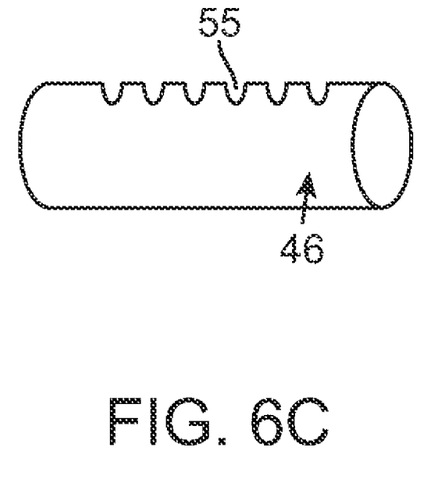
FIG. 6C shows details of a row guide of FIG. 6A.
Figure 6D:
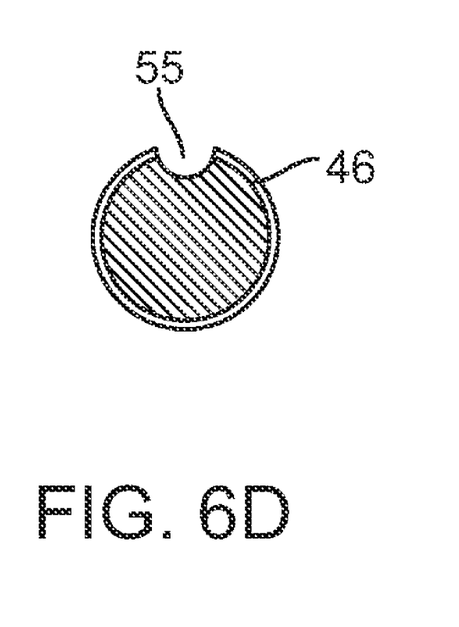
FIG. 6D shows details of a cross-section of the row guide of FIG. 6C.
Figure 6E:
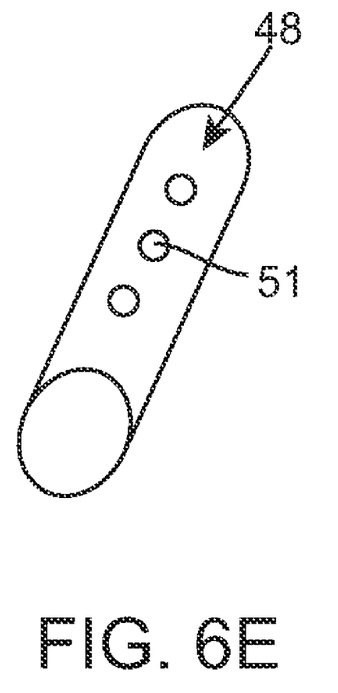
FIG. 6E shows details of a column guide of FIG. 6A.
Figure 6F:
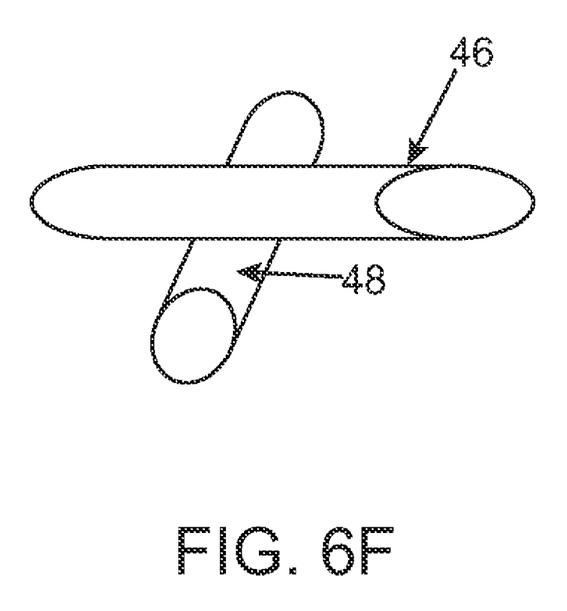
FIG. 6F shows details of a row guide on a column guide in FIG. 6A.
Figure 6G:
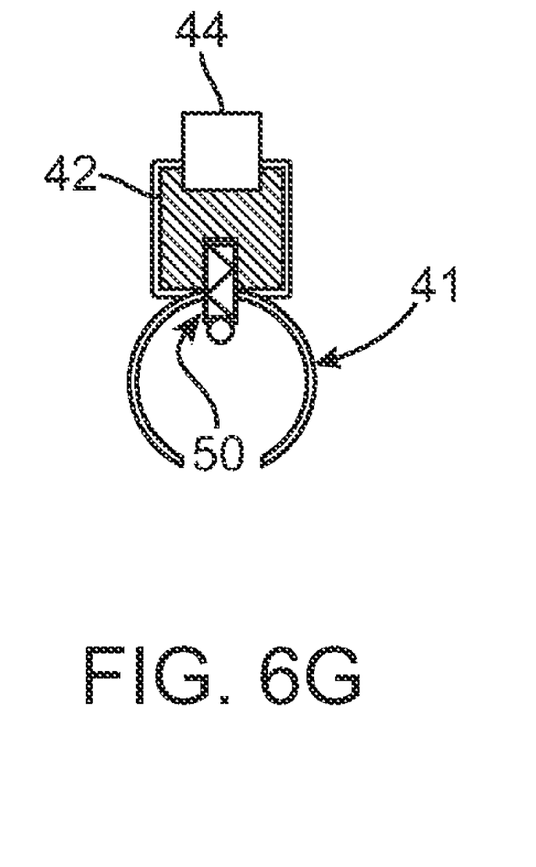
FIG. 6G shows details of a cross-section of the holder mechanism of FIG. 6A.

In another implementation, a keyboard reconfiguration mechanism 30 according to the invention includes flexible cylinder guides 16A (FIG. 5) that may be used for sliding the keys 14 thereon, to provide a layout with a disposition of the keys 14 along curve lines (as in ergonomic keyboards). The user might decide a desirable amount and location of curvature for the guides 16A.

In one example, using bio-metric parameters, a keyboard according to the invention may recall a configuration based on the recognition of the user that is accessing the keyboard (e.g., self-reconfiguration for different users) utilizing actuators for moving the keys (and/or frame) on the cylinder guides.

The cylinder guides (extendable) may be substituted with elastic bands that can allow more flexibility in modeling the desired keyboard layout.

FIG. 6 shows another example keyboard reconfiguration mechanism 40 for keyboard key motion for positioning, according to the invention. Elements of the mechanism and the guide are shown in detail as well. In the mechanism 40, each key 44 (on a frame 42) slides row-wise over a row guide 46 (e.g., cylinder, rectangular, telescoping extensible). The key 44 can move from left to right and vice-versa. Further, each key 44 can move column-wise over column guide 48.

A friction mechanism such as holders 41 at the bottom of the frame 42, snap around the outer surface of the guide 46 to maintain the frame on the guide in different positions. To lock a key in a certain position, a locking mechanism 50 includes a sleeve (cylinder) 52 holding a spring 54 inside, and a ball 53 at an open end thereof, which fits in one of several hollow cavities 55 present on the guide 46. Further, the row guide 46 for keys 14, itself slides on two column guides 48. Similar locking mechanism 50 allows positioning and locking of the row guide 46 on the column guides 48. The ball 53 of the mechanism 50 on each row guide 46 which fits in one of several hollow cavities 51 present on a column guide 48.

Figure 7:
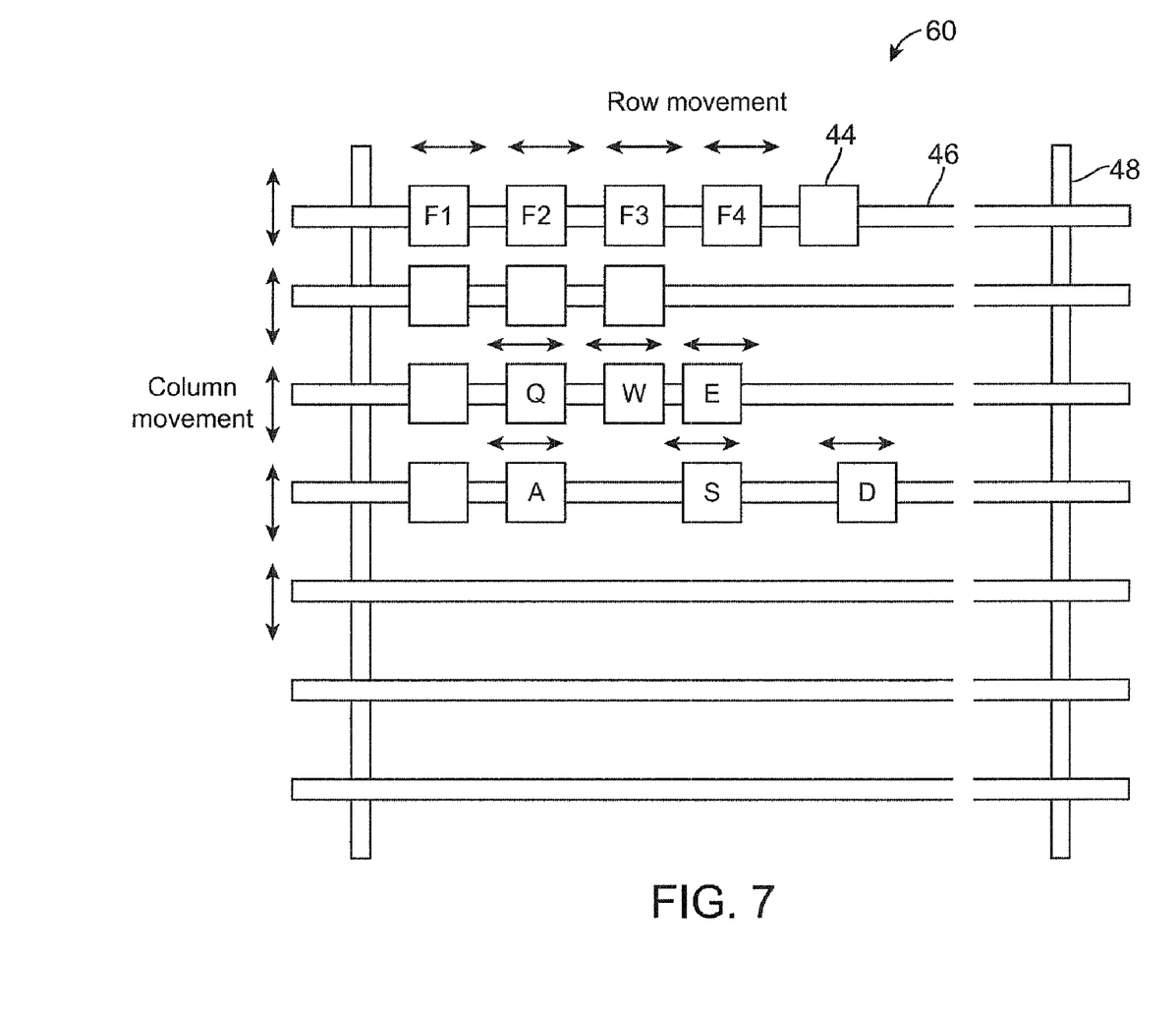
FIG. 7 shows example row and column mechanisms for reconfiguration of keys on a keyboard, according to an embodiment of the invention.

FIG. 7 shows an example keyboard 60 according to the invention, illustrating relative disposition of example keys 44 and of the row can column guides 46 and 48, respectively, and positioning movement in two transverse directions (e.g., row, columns). The guides 46, 48 may comprise elastic bands, to allow positioning of each of the keys 44 that is not fixed by a rigid guide disposition.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A reconfigurable keyboard apparatus, comprising:
   a row mounting mechanism for mounting each row of keys on a row frame, the row mounting mechanism allowing one or more keys of each row to be moved and locked in a certain row position, whereby the spacing of one or more keys in each row on the keyboard can change; and
   a column mounting mechanism for mounting each column of keys on a column frame, the column mounting mechanism allowing one or more keys of each column to be moved and locked in a certain column position, whereby the spacing of one or more keys in each column on the keyboard can change;
   wherein the row mounting mechanism allows a key of a row to be moved and locked in a certain row position, and the column mounting mechanism allows said key to be moved and locked in a certain column position, individually and independent of other keys;
   wherein one or more keys can be moved in two different transverse directions independently, row and column, and locked or unlocked in a position for arranging the keys on a keyboard according to a reconfigurable layout.

* * * * *